Jan. 19, 1932. W. S. EATON 1,842,343
METHOD AND APPARATUS FOR INDICATING DIRECTION
Filed April 15, 1929 3 Sheets-Sheet 3
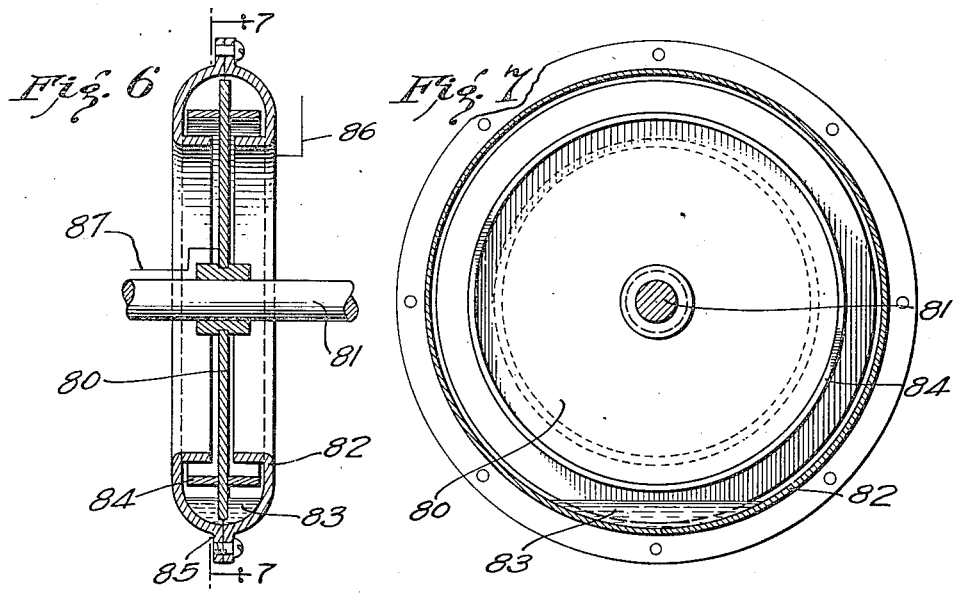
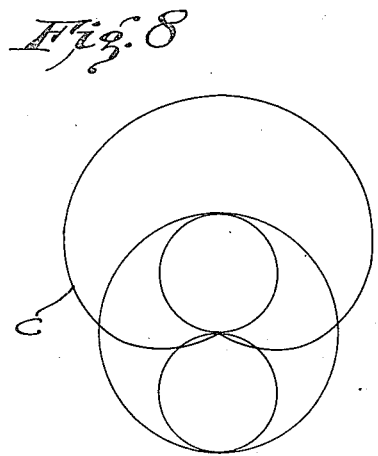
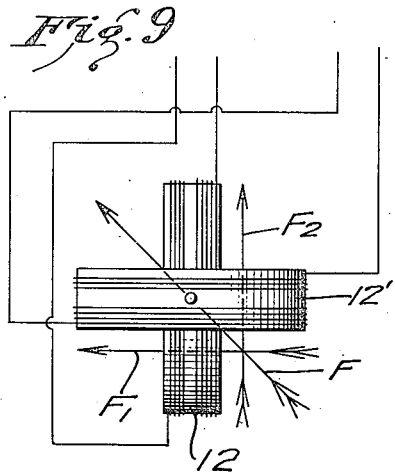
INVENTOR.
Warren S. Eaton
BY
ATTORNEYS.

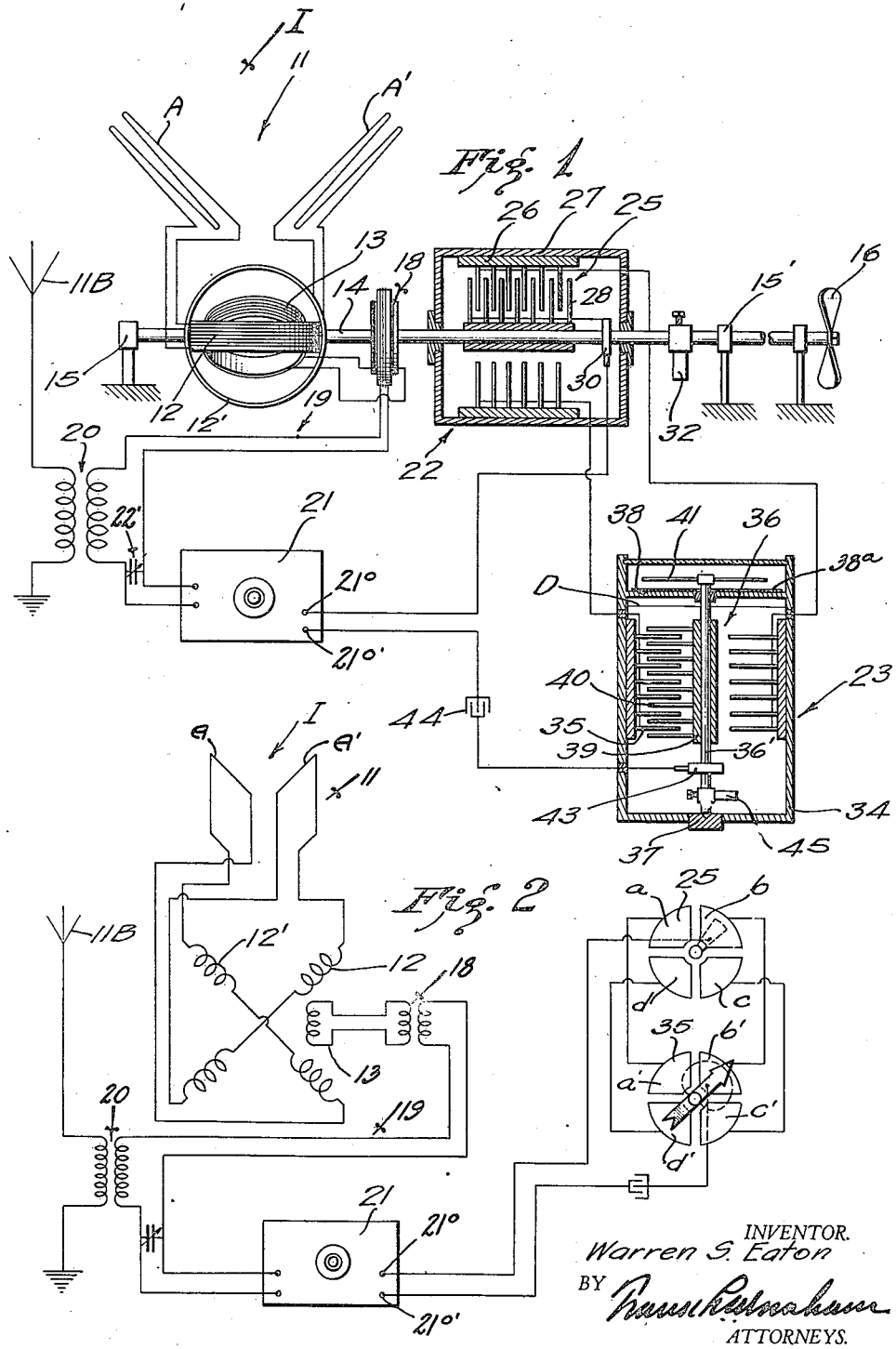

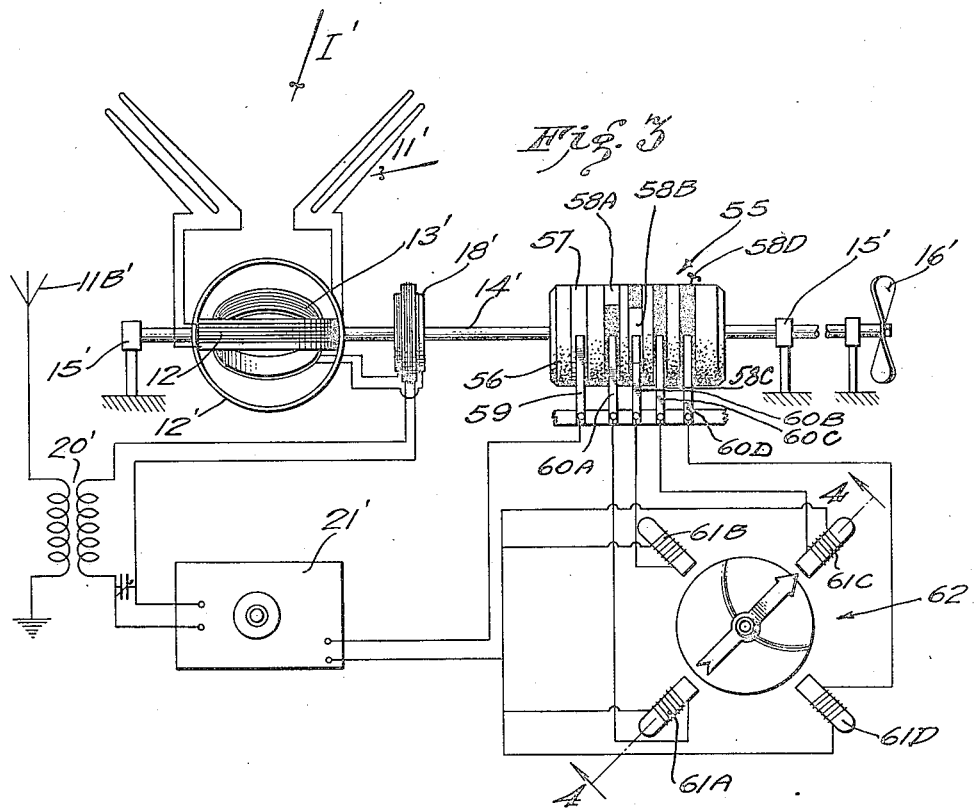
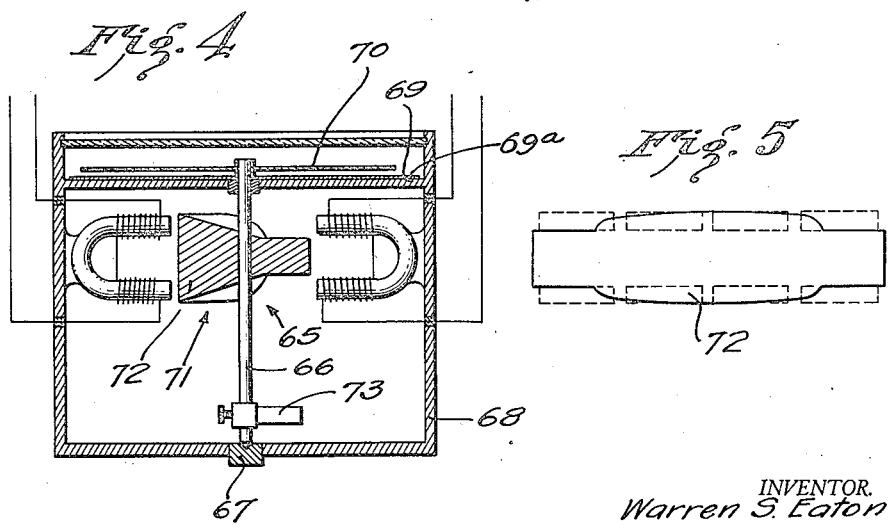

Patented Jan. 19, 1932

1,842,343

UNITED STATES PATENT OFFICE

WARREN S. EATON, OF LOS ANGELES, CALIFORNIA, ASSIGNOR TO EATON RADIO INSTRUMENT CORPORATION, OF LOS ANGELES, CALIFORNIA, A CORPORATION

METHOD AND APPARATUS FOR INDICATING DIRECTION

Application filed April 15, 1929. Serial No. 355,015.

This invention relates broadly to the utilization of radiant energy to indicate automatically the exact direction from a point of reception to the source of the radiant energy. I am claiming the feature of indicating the line of direction between the point of reception of the radiant energy and the source thereof specifically in my copending application, Serial No. 348,031, filed March 18, 1929, and broadly in my application, Serial No. 554,307, filed July 31, 1931, whereas in the present application I am claiming the feature of indicating the direction from the point of reception of the energy to the source thereof.

It is an object of this invention to automatically cause an indicator to point toward the station transmitting the radiant energy.

The manner of employing the received radiant energy for indicating the direction from the point of reception to the source of the energy, together with other advantages of my invention and further objects attending its production, will be better understood from the following description of the accompanying drawings illustrating preferred embodiments of my invention, in which Fig. 1 is a diagrammatic view, with parts in section, illustrating a preferred embodiment of my invention.

Fig. 2 is a wiring diagram of that form of my invention shown in Fig. 1.

Fig. 3 is a diagrammatic view, illustrating a modified form of my invention in which the commutation is effected by a contact commutator and the indicator is an electro-magnetic instead of an electrostatic element.

Fig. 4 is a sectional elevation, which may be considered as having been taken substantially in a plane represented by the line 4—4 in Fig. 3, and illustrates a preferred form of an electromagnetic indicator which may be used in my invention.

Fig. 5 is a diagrammatic view illustrating the development of a rotor or flux carrying member such as is preferably used in combination with the indicator shown in Fig. 4.

Fig. 6 is a sectional elevation illustrating a preferred form of mercury contact ring which may be used in combination with my invention.

Fig. 7 is a sectional elevation which may be considered as having been taken substantially in a plane represented by the line 7—7 in Fig. 6.

Fig. 8 illustrates the cardioid or heart-shaped diagram which is obtained by plotting upon polar coordinates the pulsating E. M. F. developed in my invention.

Fig. 9 is a diagrammatic view illustrating the manner in which a resultant magnetic field is produced through the combination of the fields induced in a set of coils arranged at right angles with each other.

More particularly describing the invention as herein illustrated, reference numeral 11 indicates a set of directional antennæ A and A' which are illustrated as being positioned substantially at right angles with each other and are independently connected to a set of stationary inductance coils 12 and 12', arranged in substantial parallelism with the antennæ A and A' respectively.

It will be understood that the current induced in the antennæ A and A' by the incoming wave I flows through the respective coils 12 and 12' and produces a resultant magnetic field which has a predetermined relation to, and will be hereinafter referred to as being in relative parallelism with, the direction of the incoming radio wave. This magnetic field of force is the resultant of the two fields $F_1$ and $F_2$ produced in coils 12 and 12', as diagrammatically illustrated in Fig. 9, such phenomenon being well known to those familiar with the art.

A secondary inductance coil 13 is rotatably mounted in the area circumscribed by the coils 12 and 12', and is supported in this position by means of a rotating shaft 14, illustrated as being supported by bearings 15 and 15', and adapted to receive rotation from any suitable means, such as an electric motor, or, in the event the unit is being used upon an airplane, the shaft 14 may be rotated by means of a propeller 16.

The rotation of the coil 13 in the resultant magnetic field produced by the current flowing in the coils 12 and 12' results in the production of pulsating electric current in which the phase of the E. M. F. changes abruptly for each 180° of rotation of the coil.

This pulsating current is delivered from the coil 13 through a suitable slip ring or inductance commutator 18 into a tuning and amplifying circuit generally indicated at 19.

If the current induced in an open antenna, such as antenna 11B is properly combined with the induced current coming from a rotating coil, such as the coil 13, such combination may be rendered effective to change the E. M. F. pulsations in the current in a manner such that there is a single maximum point for each rotation of the coil 13.

For the purpose of introducing a current from the open antenna 11B into the circuit 19, I show an inductance provided in the circuit at 20, one side of which is connected with the open antenna 11B.

It will be understood, therefore, that the resultant current which flows to the receiving, tuning and amplifying set 21 past the condenser 22′ is one in which the E. M. F. maxima of the pulsating current bear a predetermined relation to the direction of the incoming wave I.

The receiving and amplifying set 21 is electrically connected through commutating means 22 to an indicator 23. The operation of the commutator 22 is synchronized with the rotating coil 13, so that the maximum of the E. M. F. pulsations are always delivered to the same relative position in the commutator with respect to the position of the coil 13, it being understood that as the direction of the incoming wave changes, the position of the resultant magnetic field in coils 12 and 12′ changes correspondingly. The maximum point in the current, therefore, changes with respect to the fixed coils 12 and 12′, and likewise the position of the field of maximum reactance in the commutator 22 is changed correspondingly.

The current coming from the commutating member 22 is intermittently introduced into a plurality of field segments in an indicator 23, so as to produce what may be described as a field of force which has a region of maximum intensity and a region of minimum intensity, the relative positions of which are determined by the pulsations in the current delivered to the commutator 22 and bear a predetermined relation to the direction of the incoming wave I.

In that form of my invention shown in Figs. 1 and 2, the commutating member 22 is illustrated as comprising a plurality of vane segments, generally indicated at 25, which are arranged in relative parallelism with the antennæ A and A′.

These vane segments are mounted upon insulating members 26 within a suitable case 27, and a set of rotating vanes 28 is mounted upon one side of the shaft 14 in substantial parallelism with the coil 13, and is connected through a suitable slip ring or mercury contact 30 with one side of the output 21o of the receiving and tuning set 21.

A counterbalance 32 is illustrated as being mounted upon the shaft 14 for the purpose of counterbalancing the weight of the vanes 28, and the case 25 may, if desired, be filled with a suitable dielectric.

The indicator 23 in this form of my invention is illustrated as embodying a case 34 which supports a plurality of interconnected segmental vanes 35, which are preferably arranged in substantial parallelism with the vanes 25, the coils 12 and 12′ and the antennæ A and A′.

A rotor 36 embodying a rotatable shaft 36′, supported in a bearing 37 and extending above a diaphragm plate 38, provided with a dial 38a, is adapted to position itself in the field of force established by the segmental vanes or condenser plates 35.

This rotor is, of course, provided with a flux carrying member illustrated as comprising a sleeve 39 and a set of vanes 40 which are mounted on one side of the rotor shaft 36.

The vanes 40 are, for the purpose of accuracy in the instrument, preferably made in the shape of the cardioid or heart-shaped diagram C shown in Fig. 8, and it will be understood that the number of flux carrying rotor vanes and the number of stationary field vanes are dependent upon the characteristics of the particular receiving circuit in which the instrument is being used.

The upper end of the shaft 36 is provided with an indicating member 41, which is arranged in predetermined relation with the vanes 40, and is adapted to indicate the position of the vanes and, consequently, the position of the region of maximum intensity in the field of force produced by current flowing to the plates 35 when the apparatus is in operation.

For the purpose of steadying the operation of the rotor and the indicator, I consider it preferable to provide this unit with damping means, such as a liquid dielectric.

It will be noted in Fig. 2 that the corresponding plates 25 and 35 in the commutating member and the indicator respectively are interconnected. In other words, plates A, B, C and D in the commutating member are connected with plates A′, B′, C′ and D′ in the indicator.

Flux carrying plates 40 in the indicator are all electrically connected with each other, and are connected through a suitable slip ring or mercury contact 43 and a condenser 44 to the other side 21o′ of the output of the tuning set 21.

The rotor shaft 36 may also be provided with a counterbalancing member 45 to balance the weight of the plates 40.

The pulsating current coming from the set 21 is, due to the rotation of the rotating vanes 28 in the commutator 22, effective to provide momentary excitation to each of the plates A, B, C and D, and A', B', C', and D' respectively, and since the plates 28 rotate in synchronism with the coil 13, this excitation is such that it has a maximum value at a point which bears a predetermined relation to the resultant line of magnetic force established by the coils 12 and 12' in which coil 13 is rotating.

The result is that there is established in the indicator 23 a field of electrostatic force which has a region of maximum intensity and a region of minimum intensity separated by substantially 180° and positioned in a predetermined relation to the direction of the incoming wave I.

The rotor 36, being free to swing under the action of this electrostatic field, it will be understood that the vanes 40 will, under the action of this field of force, carry the indicator 41 to the position which indicates the above mentioned relation between the point of maximum intensity in the indicator and the direction of the incoming wave I.

It will be understood from this construction that, while the plates in the indicator have been described as being arranged in relative parallelism with the antennæ A and A', actual parallelism is not essential, since the indicator 41 may be moved upon the rotor 26 to compensate for any angular displacement between the position of the plates in the indicator and the positions of the antennæ A and A'.

A reactance unit, such as a commutator similar to the one indicated at 22, but provided with two vanes, might be substituted for the fixed coils 12 and 12' and the rotating coil 13.

Likewise an inductance unit might be substituted for the reactance indicator 23. The latter construction is illustrated in Figs. 3 to 5, inclusive in which the elements of the receiving and tuning means are the same as those described in connection with Figs. 1 and 2, and are indicated by the same reference numerals distinguished by the prime mark.

In this form of my invention, the rotatable shaft 14' is provided with a contact commutator 55 which may be of the type shown and described in my co-pending application, Serial No. 322,337, which was filed on November 28, 1928, but which, for the purpose of illustration, is shown as comprising a nonconducting cylinder 56, provided with uniform peripheral contact strip 57 and segmental contact strips indicated by reference numerals 58A, 58B, 58C and 58D respectively.

The segmental contact strips 58A, 58B, 58C and 58D respectively are arranged in spaced relation upon the nonconducting cylinder 56, and are positioned with their centers spaced radially from each other substantially 90°, so that each of the segmental strips is in relative parallelism with the coil 13' when it is passing through one of the quadrants in the area circumscribed by the coils 12 and 12'.

The contact strips 58A, 58B, 58C and 58D are each electrically connected with the uninterrupted strip 57, and the strip 57 is adapted to receive electric current from one side of the output of the receiving set 21' through a brush 59.

The brushes 60A, 60B, 60C and 60D respectively are arranged in parallel relation with each other, and are positioned so that one of the brushes contacts with one of the segmental strips during a quarter of each revolution of the shaft 14', and is out of the circuit during the remainder of the revolution.

It will be apparent from this construction that the commutator 55 produces a commutating effect which is similar to that produced in the commutator 25 described in connection with Figs. 1 and 2. In other words, the current delivered to the brushes 60A, 60B, 60C and 60D, respectively, will bear a predetermined relation to the current induced in the rotation coil 13' and will consequently bear a predetermined relation to the direction from which the incoming wave I' approaches the antennæ 11' and 11B'.

The current coming from the brushes 60A, 60B, 60C and 60D, respectively, is delivered to the respective poles 61A, 61B, 61C and 61D of an electro-magnetic indicator 62.

The poles of this indicator are made in the form of horse shoe shape solenoid members (see Fig. 4), which are wound in a manner such that the diametrically opposite poles are of like sign; in other words, north poles face north poles and south poles face south poles.

As in the electro-static form of the indicator, the horseshoe shaped solenoid members, or in other words electro-magnets, bear a predetermined angular relation with respect to the receiving antennæ, the specific relation shown in the drawing being that of parallelism.

In this construction the flux flows between the two pole faces of each horse shoe-shaped unit, and the resultant effect is the establishment of a field of force in the area circumscribed by the pole faces which has a single region of maximum intensity and a single region of minimum intensity, such regions bearing a predetermined relation to the direction from which the incoming wave I' approaches the set.

For the purpose of utilizing this field of force to indicate the direction of the incoming waves I', a rotor, generally indicated by reference numeral 65 is mounted in the area circumscribed by the pole faces. This rotor consists of a rotor shaft 66, the lower end of which is supported by a bearing 67 formed in the bottom of an indicator case 68.

The upper end of the shaft 66, carrying a needle 70, extends through a diaphragm 69, which is provided with a dial plate 69a.

Mounted on the shaft 66 at an intermediate point in a position such that it is circumscribed by the field poles 61A, 61B, 61C and 61D, respectively, I provide a flux carrying member 71. This member, in order that the unbalanced field of force may be effective to rotate the same and consequently indicate the region of maximum intensity, is provided with an enlarged section 72, the preferred shape of which is perhaps best illustrated in Fig. 5 as being a development of the cardioid diagram.

It will be understood that the shape of the flux carrying member on the rotor in both forms of my invention may be designed to compensate for the output characteristic of the particular receiving and tuning circuit in connection with which the instrument is being used.

It will be understood from this construction of the flux carrying member that the flux flowing between the top and bottom faces of the horse shoe-shaped pole members will have a maximum value in a region which bears a predetermined relation to the maximum E. M. F. value in the current pulsations induced in the rotating coil 13' and modified by the current coming from the open antenna 21', and that the rotor 71 will be swung to a position at which the center of the enlarged section 72 will lie in the region of maximum intensity in this magnetic field of force.

In order that the rotor shaft 66 may be balanced against the weight of the enlarged section 72, I provide this shaft with a counterbalancing member generally indicated by reference numeral 73.

It has been previously mentioned in connection with the description of Fig. 1, that the slip rings indicated at 30 and 43 might be mercury ring contacts, and since the mercury contact is, in this particular invention, a preferred means of conducting electric current from a rotating to a stationary conductor circuit, I have shown in Figs. 6 and 7, a preferred contact member of this nature.

This contact member consists of a plate 80, which is rigidly mounted upon a shaft 81 and has its periphery surrounded by a hollow ring 82.

The hollow ring 82 contains a small quantity of mercury, indicated at 83, and the plate 80 is provided with a transverse annular web 84, which is so positioned as to contact the mercury when the ring is moved to a horizontal position.

It will be apparent that this construction may be moved from a vertical to a horizontal position, and that during such movement either the outer edge 85 of the plate 80 or one side of the annular web 84 will be in contact with the mercury contained in the hollow ring.

The hollow ring being provided with a conductor 86, and the rotating plate being provided with a conductor 87, it will be apparent that this unit forms a connection for delivering current from a rotating to a stationary conductor in which there is a minimum of frictional resistance and in which a positive uniform electric contact is always established between the two conductors.

Although this invention is not limited in any way to the use of a mercury connection of this nature, this unit is, due to its low coefficient of friction and its high conductive properties, considered preferable for use at all points in which a contact connection is made between rotating and stationary conductors.

The operation of this invention will be apparent from the foregoing description, but it is emphasized at this time that the invention embodies a radio receiving and amplifying apparatus, in which the incoming radio impulses are received and tuned in a manner such that they produce a pulsating electric current in which all of the points of maximum E. M. F. bear the same predetermined relation to the direction from which the radio impulses approach the set; that the apparatus includes means for utilizing such current to produce a field of force having a single region of maximum intensity and a single region of minimum intensity, both of which bear a predetermined relation to the maximum and minimum points in the current pulsations, and consequently bear a predetermined relation to the direction from which the radio impulses are received, and automatic means operated by this field of force for indicating the exact direction from which such radio impulses are received.

It will be understood that, while the rotor or flux carrying member of my indicator have been described as being adapted to swing into the region of maximum intensity in a resultant field of force established by the indicator field pieces, the system might readily be modified by those familiar with the art to produce a rotor which is repelled rather than attracted by the electrostatic or electromagnetic field, and that such rotor would be revolved to the position of minimum rather than the position of maximum intensity. A rotor of this character would, however, indicate the region of maximum intensity as being opposite to the position which the rotor occupied in the resultant field of force, and this feature should receive consideration in interpreting the appended claims.

It is well known to those familiar with the art that in either an electrostatic or an electromagnetic field, the feature of attraction and repulsion between surfaces or poles of unlike and like sign may be employed to produce movement to a "rotor" or flux carrying member.

It has been an object of this invention to produce a system in which the indicator may be operated electrostatically or electromagnetically, and for this reason the term "flux carrying member" as used in the specification and claims, unless otherwise designated, may indicate either an electromagnetic or an electrostatic flux carrying member. In the former case, the member would be composed of magnetically attracted or repelled material, and in the latter case it would correspond to a movable condenser plate or set of such plates. Likewise, the term "field pieces" will be used broadly to designate either electromagnetic or electrostatic field pieces unless otherwise designated.

While the present invention is based on direction indication, and it has been described that the indicator needle will swing into the line of direction to the source of the received energy, it will of course be understood that this will occur only when the indicator needle is in a horizontal position. However, the indicator needle will always turn to the same position on the dial when indicating the same line of direction, regardless of the position of the instrument, and therefore when the face of the instrument is not disposed horizontally, as when the instrument is mounted on an instrument board, it should be arranged so that the needle will be in an upright position when the vehicle is headed along the line of direction indicated by the indicator needle of the instrument.

It is to be understood that, while I have herein described and illustrated a preferred embodiment of the invention and indicated certain modifications in the apparatus, the invention is not limited to the precise construction set forth, but includes within its scope whatever changes fairly come within the spirit of the appended claims.

I claim as my invention:

1. A radio receiving apparatus, for indicating the direction from which radio signals arrive, embodying: a set of directional antennæ; means connected with said antennæ for producing a resultant magnetic field in predetermined relation with the direction of the incoming signals; a coil rotatably mounted in said magnetic field; a circuit operatively connected to receive the induced current resulting from the rotation of said coil; means connected with said circuit for producing in said circuit a pulsating electro-motive force having a single maximum and a single minimum value for each rotation of said coil; a plurality of field pieces arranged in predetermined relation with said directional antennæ; commutating means synchronized with said rotatable coil to deliver to said field pieces electrical excitation having a maximum value and a minimum value corresponding to the maximum and minimum points in said induced electro-motive force and a flux-carrying member rotatably mounted between said field pieces and provided with an indicator for indicating the point of maximum excitation in said field pieces.

2. A radio receiving apparatus for indicating the direction from which radio signals arrive embodying: a set of directional antennæ; means connected with said antennæ for producing a resultant magnetic field in predetermined relation with the direction of the incoming signals; a coil rotatably mounted in said magnetic field; a circuit adapted to receive the induced current resulting from the rotation of said coil; an open antenna operatively connected with said circuit for producing in said circuit a pulsating electro-motive force having a single maximum and a single minimum value for each rotation of said coil; a plurality of field pieces arranged in predetermined relation with said directional antennæ; commutating means synchronized with said rotatable coil and adapted to deliver to said field pieces electrical excitation having a maximum value and a minimum value corresponding to the maximum and minimum points in said induced electro-motive force; and a flux-carrying member rotatably mounted between said field pieces and provided with an indicator for indicating the point of maximum excitation and means for damping the movement of said flux-carrying member.

3. A radio receiving apparatus for indicating the direction from which radio signals arrive embodying: a set of directional antennæ; means associated with said antennæ for producing a resultant magnetic field in predetermined relation with the direction of the incoming signals; a coil rotatably mounted in said magnetic field; a circuit adapted to receive the induced current resulting from the rotation of said coil; means operatively connected with said circuit for producing in said circuit a pulsating electro-motive force having a single maximum and a single minimum value for each rotation of said coil; a plurality of field plates arranged in predetermined relation with said directional antennæ; commutating means synchronized with said rotatable coil and electrically connected to deliver to said field plates electrical energy having a maximum value and a minimum value corresponding to the maximum and minimum points in said induced electromotive force; a rotor; a vane on one side of said rotor to rotate between said field plates; and an indicator actuated by said rotor.

4. A radio receiving apparatus for indicating the direction from which radio signals arrive embodying: a set of directional antennæ; means electrically connected with said antennæ for producing a resultant magnetic field in predetermined relation with the direction of the incoming signals; a coil rotatably mounted in said magnetic field; a circuit operatively connected to receive the induced current resulting from the rotation of said coil; means operatively connected with said circuit for producing in said circuit a pulsating electro-motive force having a single maximum and a single minimum value for each rotation of said coil; a plurality of field plates arranged in predetermined relation with said directional antennæ; commutating means synchronized with said rotatable coil to deliver to said field plates electrical energy having a maximum value and a minimum value corresponding to the maximum and minimum points in said induced electro-motive force; a rotor having a single set of parallel vanes adapted to rotate between said field plates; an indicator associated with said rotor; and means for damping the movement of said rotor.

5. A radio direction indicating device embodying: radio signal receiving means, including directional antennæ, a rotatable coil, and a capacity antenna to produce with the rotation of said coil induced electro-motive force having a single maximum value and a single minimum value for each rotation of said coil, each of said electro-motive force values bearing a predetermined relation to the direction of the incoming signal; a plurality of field pieces; commutating means electrically connected with said signal receiving means for electrically energizing said field pieces proportionately with said induced electro-motive force to produce a field of force having a maximum value at a single point which bears a predetermined relation to the direction of the incoming wave; and automatic means for indicating the position of the maximum point in said field of force.

6. A radio direction indicating device embodying radio signal receiving means, including directional antennæ, a rotatable coil and a capacity antenna to produce with the rotation of said coil induced electro-motive force having a single maximum value and a single minimum value for each rotation of said coil, each of said electro-motive force values bearing a predetermined relation to the direction of the incoming signal; a plurality of field pieces; commutating means electrically connected with said signal receiving means for electrically energizing said field pieces proportionately with said induced electro-motive force to produce a field of force having a maximum value at a single point which bears a predetermined relation to the direction of the incoming signal; and automatic means including a rotor for indicating the position of the maximum point in said field of force.

7. A radio direction indicating apparatus embodying: radio signal receiving means, including directional antennæ, a rotatable coil and a capacity antenna to produce an electro-motive force with the rotation of said coil, having a single maximum value and a single minimum value for each rotation of said coil, each of said electro-motive force values bearing a predetermined relation to the direction of the incoming signal; a plurality of parallel condenser plate segments; commutating means electrically connected with said signal receiving means for producing in said condenser plate segments an electrostatic field of force having maximum strength at a single point which bears a predetermined relation to the direction of the incoming signal; and automatic means for indicating the position of the maximum point in said electrostatic field of force.

8. A radio direction indicating apparatus embodying: radio signal receiving means, including directional antennæ, a rotatable coil and a capacity antenna to produce induced electro-motive force with the rotation of said coil, having a single maximum and a single minimum value for each rotation of said coil, each of said induced electro-motive force values bearing a predetermined relation to the direction of the incoming signal; a plurality of parallel condenser plate segments; commutating means electrically connected with said signal receiving means for producing in said condenser plate segments an electro-static field of force having maximum strength at a single point which bears a predetermined relation to the direction of the incoming signal; a rotor mounted in said field and having a single set of parallel vanes and an indicator on said rotor for indicating the maximum point in said electrostatic field of force.

9. A radio direction indicating apparatus embodying: means for receiving radio impulses; means for converting said impulses into a field of force having a single region of maximum intensity which is located in predetermined relation to the direction from which the radio impulses are received; and automatic means for indicating the location of said region of maximum intensity.

10. A radio direction indicating apparatus embodying: means for receiving radio impulses; means for converting said impulses into an electric current of pulsating electro-motive force in which all of the periods of maximum electro-motive force have the same predetermined relation to the direction from which the radio impulses are received; commutating means to deliver said current into different circuits; indicating means embodying said last mentioned circuits, for producing from said current a field of force having a single region of maximum intensity in predetermined relation to the direction from which said radio impulses are received; and automatic means for indicating the location of said region of maximum intensity in said field of force.

11. A radio direction indicating apparatus embodying: means for receiving radio impulses; means for converting said impulses into a field of force having a single region of maximum intensity and a single region of minimum intensity located in predetermined relation to the direction from which said radio impulses are received; and automatic means for indicating the relative positions of said regions of maximum and minimum intensities.

12. A radio direction indicating apparatus embodying: means for receiving radio impulses; means for converting said impulses into an electric current of pulsating electromotive force in which all of the periods of maximum electro-motive force have the same predetermined relation to the direction from which the radio impulses are received; means electrically connected with said converting means for producing from said current a field of force having a single region of maximum intensity in predetermined relation to the direction from which said radio impulses are received; and automatic means for indicating the location of said region of maximum intensity in said field of force.

13. A method for indicating the direction from a receiving point to a source of electromagnetic energy, which includes directionally receiving said energy, resolving said energy into a pulsating electric current, in which the maximum electro-motive force is substantially 180° away from the minimum electro-motive force, and producing, with said current, a field of force having a single maximum region and a single minimum region, each of which regions has a predetermined relation with the direction in which said energy is received, and utilizing solely and exclusively said field of force to indicate the direction in which said energy is received.

14. A method of indicating the direction from a point to a source of electro-magnetic energy which includes receiving said electromagnetic energy, generating by said received energy a unidirectional field of force bearing a predetermined relation with the direction from said point to said source and utilizing solely and exclusively said field of force to visually indicate the direction from said point to said source.

15. A method of indicating the direction from a point to a source of electro-magnetic energy which includes receiving said electromagnetic energy in a varying amount, generating by said received energy a field of force having a single region of maximum and a single region of minimum, said regions bearing a predetermined relation to the direction from said point to said source, and utilizing solely and exclusively said field of force to visually indicate the direction from said point to said source.

16. A method of indicating the direction from a receiving point to a source of electro-magnetic energy, which includes directionally receiving electro-magnetic energy, generating with said energy a field of force having a single region of maximum intensity which is located in predetermined relation to the direction in which the said energy is received and solely and exclusively indicating by said field of force the direction in which said energy is received.

17. A method of indicating the direction from a point to a source of electro-magnetic energy which includes receiving said electro-magnetic energy, generating by said received energy fields of force, the effect of which is a single unidirectional field of force baring a predetermined relation to the direction from said point to said source, and utilizing solely and exclusively said single field effect to visually indicate the direction from said point to said source.

18. A method of indicating the direction from a point to a source of electro-magnetic energy which includes, receiving said electro-magnetic energy in a varying amount, generating by said received energy fields of force the effect of which is a single field of force having a single region of maximum and a single region of minimum, said regions bearing a predetermined relation to the direction from said point to said source, and utilizing solely and exclusively said single field effect to visually indicate the direction from said point to said source.

19. An apparatus for indicating the direction from a point to a source of electro-magnetic energy comprising, means for receiving said electro-magnetic energy, means for generating by said received energy a unidirectional field of force bearing a predetermined relation with the direction from the said point to the source of electro-magnetic energy, and means including a flux-carrying member actuated solely by said field of force to visually indicate the said direction.

20. An apparatus for indicating the direction from a point to a source of electro-magnetic energy comprising, means for receiving said electro-magnetic energy, means for generating by said received energy a unidirectional field of force bearing a predetermined relation with the direction from the said point to the source of electro-magnetic energy, and means including a flux-carrying member rotatably mounted in and actuated solely by said field of force to visually indicate the said direction.

21. An apparatus for indicating the direction from a point to a source of electro-magnetic energy comprising means for receiving said electro-magnetic energy, means for generating by said received energy a field of force having a single region of maximum and a single region of minimum, said maximum and minimum regions bearing a predetermined relation with the direction from the point to the source of said electro-magnetic energy, and means including a flux-carrying member rotatably mounted in said field and provided with an indicator mounted on said flux-carrying member in said predetermined relation, whereby said field of force will move said flux-carrying member to a position determined by said points of maximum and minimum and then the indicator will indicate the direction from the apparatus to the source of the incoming electro-magnetic energy.

22. An apparatus for indicating the direction from a point to a source of electro-magnetic energy comprising means for receiving said electro-magnetic energy, means for generating by said received energy a unidirectional field of force bearing a predetermined relation with the direction from the point to the source of said electro-magnetic energy, and means including a flux-carrying member for utilizing said field of force to visually indicate the direction from said point to said source, said flux-carrying member and field of force being mutually associated so that said field of force acts directly and independently upon the flux-carrying member to actuate the same to indicate the direction.

23. A radio direction indicating apparatus embodying, means for directionally receiving electro-magnetic energy, means for generating with said energy a field of force, having a single region of maximum intensity which is located in predetermined relation to the direction in which the said energy is received, and means actuated solely and exclusively by said field of force for indicating the direction in which said energy is received.

In testimony whereof, I have hereunto set my hand at Los Angeles, California, this 22nd day of March, 1929.

WARREN S. EATON.